July 26, 1927. Re. 16,689

R. H. FORD ET AL

REENFORCED CONCRETE CRIBBING

Original Filed Feb. 24, 1919

Inventors
Robert H. Ford, Charles P. Richardson,
Alexander I. Greenybaum & Henry M. Priest
by Wylie & Brown Attys.

Reissued July 26, 1927. Re. 16,689

UNITED STATES PATENT OFFICE.

ROBERT H. FORD, CHARLES P. RICHARDSON, AND ALEXANDER L. GREENABAUM, OF CHICAGO, ILLINOIS, AND HENRY M. PRIEST, OF EAST ORANGE, NEW JERSEY, ASSIGNORS TO CHARLES P. RICHARDSON, TRUSTEE, OF CHICAGO, ILLINOIS.

REENFORCED-CONCRETE CRIBBING.

Original No. 1,312,689, dated August 12, 1919, Serial No. 278,810, filed February 24, 1919. Application for reissue filed August 27, 1925. Serial No. 52,971.

Our invention relates to an improvement in reenforced concrete cribbing or retaining wall more especially adapted for supporting embankments or "fills" where the foundation material or other conditions make the construction of the ordinary retaining wall impracticable; the invention having for its object the provision of an economical construction composed of standardized units of such formation that the adaptability of the cribbing to varying conditions is enhanced; the invention at the same time contemplating units of such formation as will greatly simplify and reduce the cost of construction of a retaining wall or cribbing; wherein the necessity of cementing or otherwise joining the units is eliminated; while on the other hand, a yielding structure is provided which will adjust itself without rupture or injury.

The above enumerated objects and advantages, as well as others inherent in the construction, will be more readily comprehended from the following detailed description of the accompanying drawings, wherein:

Figure 5 illustrates the same in elevation; while

Figure 1:
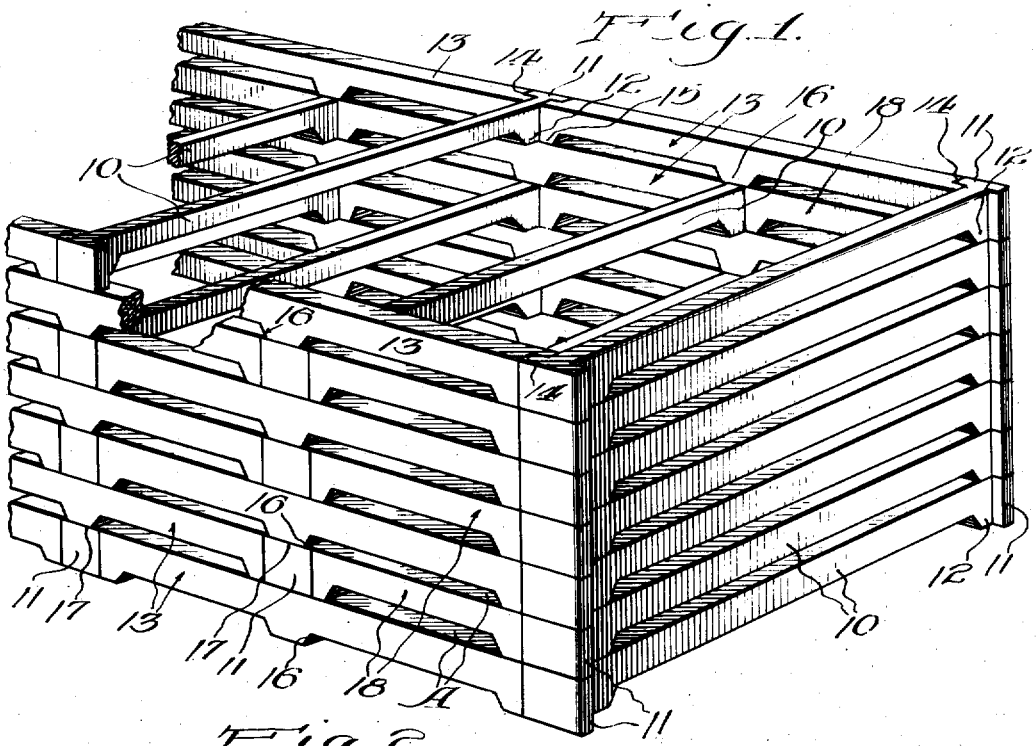
Figure 1 is a perspective view, in elevation, of a structure or cribbing composed of our improved units, with portions broken away.
Figure 2:
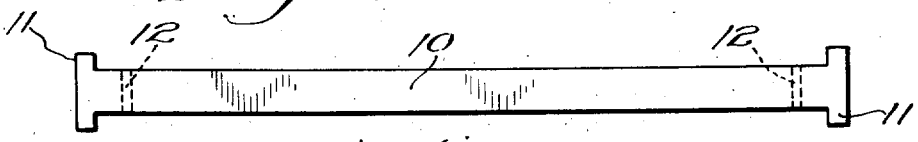
Figure 2 is a plan view of our improved header.

In the particular exemplification of the invention, as illustrated in Fig. 1, the cribbing is composed of a plurality of headers and stretchers disposed in vertical rows; with each row composed of a plurality of courses of headers and stretchers.

Figure 3:
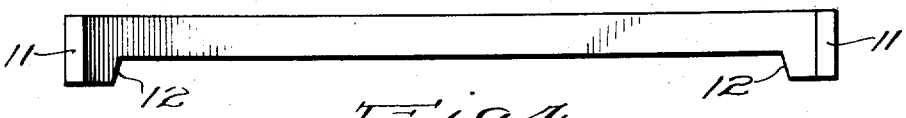
Figure 3 illustrates the same in elevation.

Our improved headers, illustrated at 10, consist of properly reenforced concrete molded into a predetermined length and preferably substantially rectangular in cross-section at points intermediate of the ends of the headers; while both ends of the headers are provided with similar heads 11, 11, T-shape in cross-section. The heads or ends 11 are also preferably of greater vertical dimensions than the vertical dimensions of the main or body portion of the header, as clearly shown in Figs. 1 and 3; that is to say the ends or heads 11 are formed flush with what may be termed the upper surface of the headers, so that the vertical enlargements are arranged to extend beyond or depend from the lower surface of the main portion, as clearly shown in the drawing. The depending extensions of the ends or heads 11 are each provided with a reenforcing portion or lobe 12 preferably of width corresponding with the width of the main or body portion of the header. The headers 10 are adapted to extend from front to rear of the cribbing, that is, in a direction transversely of the cribbing, as clearly shown in Fig. 1, and arranged in vertical rows with the lower extended portions of the ends or heads 11 in contact with the subjacent stretchers.

Figure 4:
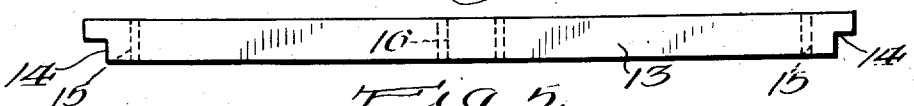
Figure 4 is a plan view of our improved stretcher.
Figure 5:
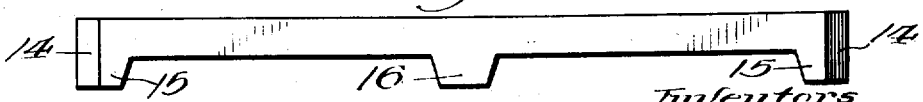

The stretchers shown at 13 are also composed of reenforced concrete of predetermined length and dimensions, with the main portion thereof rectangular in cross-section at points intermediate of the ends; while the ends themselves are kerfed as shown at 14 in Figs. 4 and 5; the kerfs being located on the same longitudinal side of the stretcher to adapt said kerfs to receive the laterally extended portions or heads 11 of the headers 10 and permit the ends of the headers to come flush with the outer longitudinal sides of the stretchers 13, as shown in Fig. 1. The ends of the stretchers 13 are enlarged by providing the downwardly disposed lobes or extensions 15, which are of vertical dimensions substantially similar to the vertical dimensions of the depending portions or lobes 12, 12, of the headers 10, thereby permitting the upper surfaces of the headers and stretchers to be flush with each other and therefore be disposed in substantially the same horizontal plane. The lobes or extensions 15 formed at both ends of the stretchers 13 are intended to contact with the upper surface of the subjacent stretchers or units, as shown in Fig. 1, and thus provide a suitable support and bearing at the ends of said stretchers which are thereby maintained in spaced relation with each other throughout their lengths in a manner similar to the headers 10 so as to provide an interstitial cribbing or retaining element, as shown in Fig. 1. At a point intermediate of the ends, each stretcher 13 is preferably provided with a depending lug or lobe, as at 16, formed integral with the body portion and of vertical dimension equal to the vertical dimensions of the extensions or lobes 15 in order that the stretchers may have support at points intermediate of their ends by reason of the contact of said intermediate lobes or lugs 16 with the upper surface of the subjacent stretchers and headers. With our improved stretchers having a central support, namely at a point intermediate of the ends, enables the units to be laid in courses so as to provide a cribbing with broken or staggered joints, with the result that a more stable structure is provided.

As is evident from the construction shown and described, and as is well understood by those familiar with the art, the various courses are laid by arranging the headers 10 in directions substantially transverse to the embankment or "fill" to be sustained by the cribbing; while the stretchers 13 are disposed in a direction substantially parallel with the embankment; and the superposed courses are so laid that the joints between the headers and stretchers of different courses are preferably made to alternate or come in different vertical rows, as more clearly shown in Fig. 1 at the points 17, wherein each superposed row is so arranged that the intermediate lobe or extension 16 of a stretcher will be disposed on the ends or heads 11 of the subjacent header 10, thus causing the interlocking connection between the headers or stretchers of successive or superimposed courses to alternately occur in different vertical planes. This alternating arrangement of the units, as before stated, is made possible by reason of the intermediate lobe 16 on each stretcher which may contact with the head of a subjacent header and thus provide continuous vertical columns throughout the length of the cribbing and enable a more flexible or yielding structure to be constructed.

As is readily apparent from the construction shown and described, a firm interlocking relation between the respective headers and stretchers, throughout the entire length of the cribbing or retaining structure, against any lateral or outward pressure is provided; a cellular wall or structure being provided, wherein the cellular spaces, it will be understood, are intended to be filled in with gravel, rock or other suitable material, of which the embankment or filling is intended to be composed; the material being, of course, introduced after a sufficient number of courses have been laid.

Figure 6:
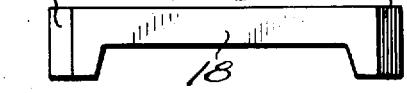
Figure 6 illustrates in elevation a short stretcher.

Our improved construction may be cheaply produced and is of such simplicity that a cribbing may be quickly constructed, which is adapted to varying conditions and at the same time will obviate the necessity for providing a great number of elements or employing anchoring elements or cementing means, as has heretofore been necessary in constructing a retaining structure or cribbing.

Where the different courses are arranged as before stated so as to provide broken or staggered joints, it will be understood that ragged or jutting ends would result. Therefore where it is intended to have the ends of the stretchers disposed in the same vertical plane or come flush at the ends of the cribbing, so that the end elements will be flush with each other, a short stretcher 18, see Figs. 1 and 6, may be employed so as to provide a flush end construction as shown in Fig. 1. The short stretchers 18 are substantially similar to the stretchers 13, except, that with the short members 18, which are intended mainly as extension members, it is not deemed necessary to provide them with the central or intermediate lobes or extensions 16; the ends of the short stretchers 18 being, however, provided with similar kerfs as the long stretchers 13 shown in Figs. 4 and 5.

The advantages of our invention are readily apparent from the construction shown wherein the headers and stretchers of the various courses throughout the cribbing will have firm interlocking relation with one another, so that any lateral or sliding relation between the elements will be prevented.

We have shown and described what we believe to be the simplest and best adaptation of our invention, but changes may be made in details of construction and general arrangement of parts without, however, departing from the spirit of our invention.

What we claim is:

1. In a concrete cribbing having longitudinally disposed stretchers and transversely arranged headers, the headers having extensions at both ends thereof disposed laterally beyond two parallel sides of the headers, said extensions also depending beyond the lower surfaces of the headers, while the stretchers are provided with kerfed ends, with the kerfs arranged on the same longitudinal sides of the stretchers and of dimensions substantially similar to the dimensions of the laterally disposed extensions on the ends of the headers, whereby said kerfed ends of the stretchers are adapted to receive the lateral extensions of the headers and provide interlocking relation between the ends of the headers and stretchers.

2. In a concrete cribbing having longitudinally disposed stretchers and transversely arranged headers, the headers being provided with extensions at both ends disposed laterally beyond two parallel sides of the headers and with extensions depending beyond the lower sides of the headers and at the ends thereof, while the stretchers are provided with kerfs at the ends thereof arranged on the same longitudinal sides and adapted to receive the laterally disposed extensions of the headers, the ends of the stretchers being also provided with extensions on the lower sides thereof of vertical length substantially equivalent to the vertical length of the depending extensions at the ends of the headers.

3. In a concrete cribbing composed of longitudinally disposed stretchers and transversely arranged headers, with the headers having extensions at both ends disposed laterally beyond two opposite sides of the headers and depending beyond the lower surfaces of the headers, while the stretchers are provided with kerfs at the ends thereof arranged on the same longitudinal sides and formed to receive the laterally disposed extensions of the headers, the ends of the stretchers being provided with depending extensions on the lower sides thereof of the same vertical length as that of the depending extensions at the ends of the headers, said stretchers being also provided with depending extensions intermediate of the ends thereof, of the same vertical length as said previously mentioned depending extensions.

4. A concrete cribbing having longitudinal rows of stretchers and rows of headers arranged at right angles to the stretchers, the stretchers and headers being provided with enlargements whereby the superposed units are maintained in spaced relation, all of said enlargements being formed of substantially equal vertical dimensions, each longitudinal row of the cribbing being composed of a plurality of headers and stretchers arranged in intersecting relation so that the enlargements of the headers in one horizontal row will be coincident with the enlargements of the stretchers in adjacent horizontal rows, with the ends of the headers and stretchers being arranged in interlocking relation with one another.

5. A concrete cribbing having longitudinally disposed stretchers and transversely arranged headers, the headers having extensions disposed laterally beyond two parallel sides of the headers and depending beyond the lower surfaces of the headers, while the stretchers are provided with kerfed ends of dimensions substantially similar to the dimensions of the depending portions of the extensions on the header end, whereby said kerfed ends of the stretchers are adapted to receive the lateral extensions of the headers and provide interlocking relation between the headers and stretchers.

In witness whereof, we, the said ROBERT H. FORD, CHARLES P. RICHARDSON, ALEXANDER L. GREENABAUM, and HENRY M. PRIEST, have hereunto set our hands.

ROBERT H. FORD.
CHARLES P. RICHARDSON.
ALEXANDER L. GREENABAUM.
HENRY M. PRIEST.